Nov. 11, 1958 L. SYKES 2,860,260

TRANSISTOR INTEGRATOR

Filed Sept. 27, 1956

INVENTOR.
LANGTHORNE SYKES
BY
ATTORNEYS 2,860,260
Patented Nov. 11, 1958

2,860,260

TRANSISTOR INTEGRATOR

Langthorne Sykes, China Lake, Calif., assignor to the United States of America as represented by the Secretary of the Navy Application September 27, 1956, Serial No. 612,565

1 Claim. (Cl. 307—88.5)

(Granted under Title 35, U. S. Code (1952), sec. 266)

The invention described herein may be manufactured and used by or for the Government of the United States of America for governmental purposes without the payment of any royalties thereon or therefor.

The present invention relates to voltage integrators and particularly to voltage integrators using silicon high-alpha junction transistors.

Previously, voltage integration had been achieved in vacuum tube circuits by using the Miller effect to obtain a very large effective capacitance. This method required a number of auxiliary components, including a fragile vacuum tube with its power supply, and in addition, the integrated signal was inverted in polarity with respect to the input.

The magnetic integrator is more rugged, but its output is not continuously available, and it is rather difficult to reproduce.

The present invention overcomes the aforementioned disadvantages and is characterized by simplicity, ruggedness, small size and direct non-inverted voltage output.

It is, therefore, an object of the present invention to provide a voltage integrator which provides a direct non-inverted voltage output.

It is another object of the invention to provide a voltage integrator which is simple, rugged and small in size.

It is a further object of the invention to provide a transistor integrator using silicon high-alpha junction transistors.

Other objects and many of the attendant advantages of this invention will be readily appreciated as the same become better understood by reference to the following detailed description when considered in connection with the accompanying drawing wherein.

Figure 1:
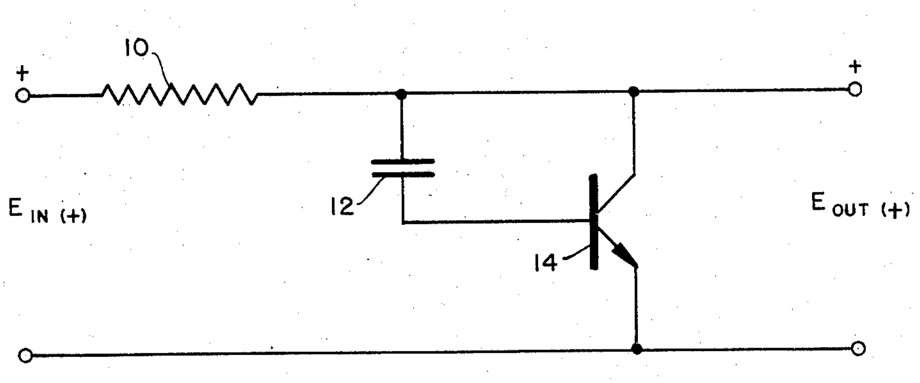
Fig. 1 is a schematic wiring diagram of one form of the invention.

The basic integrator circuit of the present invention, as shown in Fig. 1, involves only a suitable resistor 10, a capacitor 12, a transistor 14, and input and output terminals. Transistor 14 may be either an n-p-n or p-n-p transistor. One end of the resistor 10 is connected to the positive input terminal. The other end of resistor 10 is connected to one side of condenser 12, to the collector of transistor 14 and to the positive output terminal. The other side of condenser 12 is connected to the base of transistor 14. The other input terminal is connected to the emitter of transistor 14 and to the other output terminal. With this system the integrated signal output is of the same polarity with respect to the signal input.

In the circuit of Fig. 1, transistor 14 may be regarded as a constant current device which diverts "α" percent of the current through resistor 10 through itself regardless of the voltage across capacitor 12 and thereby effectively increasing greatly the capacity of capacitor 12 and the time constant of the circuit.

Its operation is described by the following expression which is derived by standard methods of circuit analysis:

$$E_{\text{out}}=\frac{1-\alpha}{RC}\cdot\int_0^t E_{\text{in}}(t)\,e^{\frac{-t}{r_c C}}dt$$

Or if E is a constant:

$$E_{\text{out}}=E_{\text{in}}t\left(\frac{1-\alpha}{RC}\right)\left(1-\frac{t}{2r_c C}+\cdots\right)$$

where $r_c$ is the transistor's collector impedance and $\alpha$ is its grounded base current gain. It is desirable to have both $r_c$ and $\alpha$ as high as possible. While germanium transistors have insufficient $r_c$ as well as other undesirable characteristics, silicon transistors have both high $r_c$ and high $\alpha$, providing integrator time constants as high as 1000 seconds.

The integrator of Fig. 1, described above, can integrate only monotonically; that is, the slope of the output cannot change sign. To provide both positive and negative integration it is necessary to add another transistor to the circuit of Fig. 1, as illustrated in the circuit of Fig. 2.

Figure 2:
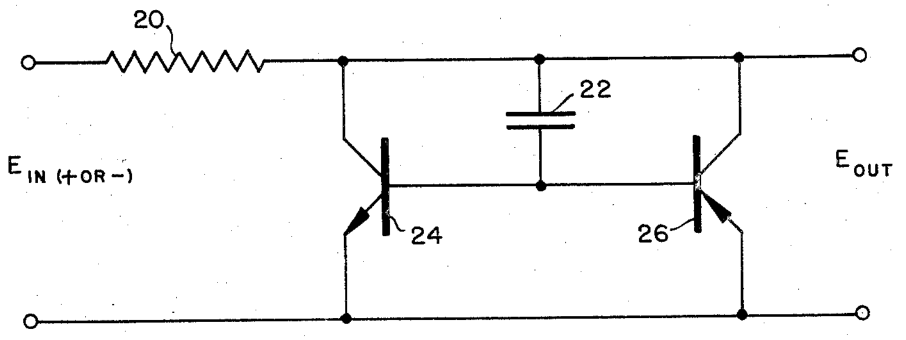
Fig. 2 is a schematic wiring diagram of another form of the invention.

The circuit of Fig. 2 comprises a resistor 20, a capacitor 22, an n-p-n transistor 24, a p-n-p transistor 26, and input and output terminals. The n-p-n and p-n-p transistors 24 and 26 are matched transistors. The components in Fig. 2 are connected substantially the same as in Fig. 1. The equations which applied to the operation of Fig. 1 also apply to the circuit of Fig. 2, since while one transistor is operating the other is cut off. Transistors 24 and 26 alternately, depending on the polarity of $E_{in}$, divert $\alpha$ percent of the current through resistor 20 through themselves.

Where $E_{in}$ is positive no current will flow through transistor 26. The charging current for condenser 22 comprises the input current flowing into the base of transistor 24. Transistor 24 then acts together with resistor 20 as a voltage dividing network; transistor 24 acting as a variable impedance element which reduces the current flowing into condenser 22 to $1-\alpha$ percent of the current through resistor 20. The output voltage $E_{out}$ is then proportional to the integral of the condenser charging current, which is the current through resistor 20 less the current diverted by transistor 24. When $E_{in}$ goes to zero, transistors 24 and 26 are both cut off, and the charge on condenser 22 is maintained constant. When $E_{in}$ becomes negative transistor 24 remains cut off, and transistor 26 is turned on and operates to reduce the charge on condenser 22 thereby providing non-monotonic integration. Which transistor is on is dependent only upon the polarity of $E_{in}$ and is not dependent upon the polarity or magnitude of the charge on condenser 22.

Since the output is at a fairly high impedance level, it should be isolated by a grounded collector stage, or if a comparator is used it should operate by Zener turnover of a diode, or, if desired, one integrator can drive another directly for double integration.

Obviously many modifications and variations of the present invention are possible in the light of the above teachings. It is, therefore, to be understood that within the scope of the appended claims the invention may be practiced otherwise than as specifically described.

What is claimed is:

A voltage integrator network which provides both positive and negative integration comprising, a resistor, a capacitor, an n-p-n transistor, a p-n-p transistor, a pair of input terminals and a pair of output terminals; one of said input terminals being connected to one end of said resistor, the other of said input terminals being connected to the emitters of said n-p-n and p-n-p transistors and to one of said output terminals; the other end of said resistor being connected to one end of said capacitor, to the collectors of said n-p-n and p-n-p transistors and to the other of said output terminals; the bases of said n-p-n and p-n-p transistors being electrically connected together and to the other end of said capacitor.

References Cited in the file of this patent

UNITED STATES PATENTS

| | | |
|---|---|---|
| 2,735,011 | Dickinson | Feb. 14, 1956 |
| 2,780,752 | Aldrich et al. | Feb. 5, 1957 |

OTHER REFERENCES

Pub. I, "Differentiating and Integrating Circuits," November 1944, Electronics, pp. 138–142.

Pub. II, "Junction Transistor Pulse Forming Circuits," September 1954, Electronics, pp. 165–167.

Pub. III, "Complementary Symmetry," September 1953, Electronics, pp. 140–143.